No. 618,806. Patented Jan. 31, 1899.
D. C. RIPLEY.
GLASS LAMP CHIMNEY AND SHADE.
(Application filed Dec. 27, 1897.)
(No Model.)
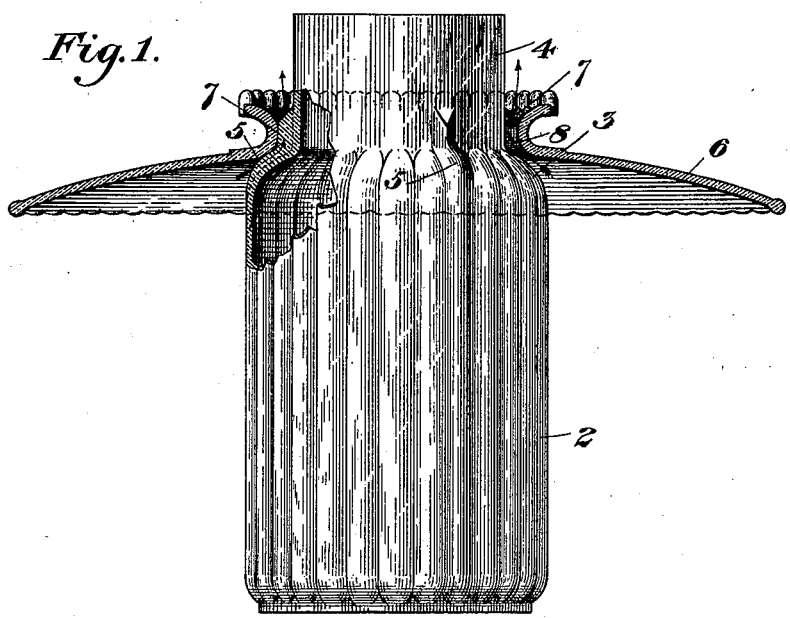
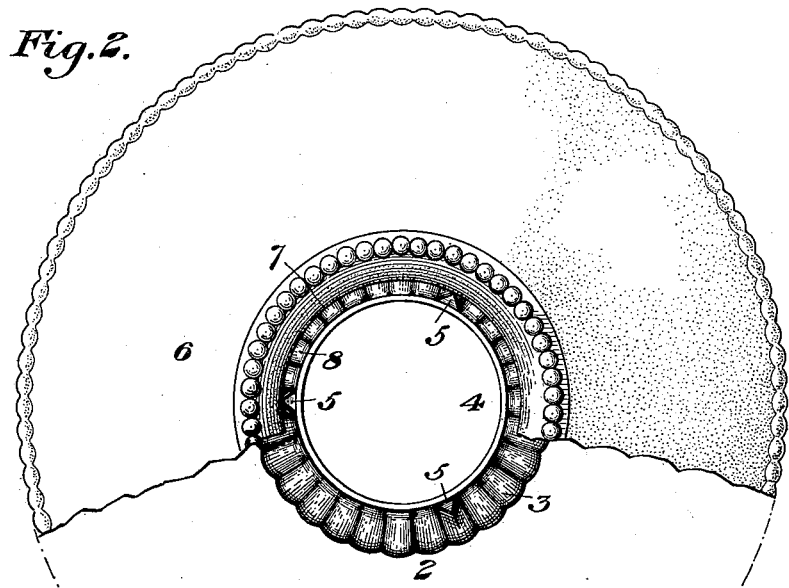
WITNESSES
Thomas W. Bakewell
Tindell A. Conner
INVENTOR
Daniel C. Ripley

UNITED STATES PATENT OFFICE.

DANIEL C. RIPLEY, OF PITTSBURG, PENNSYLVANIA, ASSIGNOR TO THE UNITED STATES GLASS COMPANY, OF SAME PLACE.

GLASS LAMP CHIMNEY AND SHADE.

SPECIFICATION forming part of Letters Patent No. 618,806, dated January 31, 1899.

Application filed December 27, 1897. Serial No. 663,538. (No model.)

*To all whom it may concern:*

Be it known that I, DANIEL C. RIPLEY, of Pittsburg, in the county of Allegheny and State of Pennsylvania, have invented a new and useful Improvement in Glass Shades and Chimneys, of which the following is a full, clear, and exact description, reference being had to the accompanying drawings, forming part of this specification, in which—

Figure 1 is a side elevation of the chimney, partly broken away and showing the shade in section. Fig. 2 is a top plan view of the same, the shade being broken away so as to show the chimney.

My invention has for its object to enable a glass shade to be used on a glass lamp globe or chimney without any support other than the chimney itself and without liability of being broken or of breaking the chimney by the action of the heat at the place of contact. Such construction is of special importance with lamps or burners, such as the Welsbach burner, in which a high degree of heat is generated by the flame, and the attempts heretofore made to accomplish the desired result by the interposition of non-conducting gaskets have been inconvenient.

In the drawings, 2 represents a glass lamp chimney or globe having a shoulder 3 and a neck 4 above the shoulder. On the shoulder 3 are several projecting lugs 5. The lamp-shade 6 has a central neck-opening 7, made of substantially larger diameter than the neck of the chimney, so that when the shade is placed over the chimney around the neck it will rest on and be supported by the lugs, and an intermediate air-space 8 of a size sufficient to permit the passage of a current of air will be afforded.

When the chimney is in use and the shade supported, as above explained, a free circulation of air will take place through the air-space 8 and will prevent the rapid conduction of heat from the chimney to the shade at the place of contact, which would take place if the lugs and air-space were not present and which would result in the breaking of the chimney or shade.

I prefer that the lugs should extend vertically a short distance, so as to fit inside the circle of the neck-opening of the shade and to center the same, as shown in the drawings.

In the drawings I show the chimney fluted for the purpose of ornament; but this is not essential to my invention.

If desired, the lugs may be formed on the shade instead of on the shoulder of the chimney.

I claim—

1. The combination of a glass chimney having a shoulder and a neck above the same, and a glass shade having a neck-opening of substantially larger diameter than the neck of the chimney, one of said parts (chimney and globe) having integral lugs adapted to uphold the shade from the shoulder and retain the shade equidistant from the neck and afford an intermediate air-space.

2. The combination of a glass chimney having a shoulder and a neck above the same, and a glass shade having a neck-opening of substantially larger diameter than the neck of the chimney, one of said parts (chimney and globe) having integral lugs upon the shoulder and neck portions, adapted to uphold the shade from the shoulder, and retain the rim of the shade-opening equidistant from the neck, and afford an air-space between shoulder and neck, and the shade; substantially as described.

In testimony whereof I have hereunto set my hand.

DANIEL C. RIPLEY.

Witnesses:
 THOMAS W. BAKEWELL,
 G. I. HOLDSHIP.